D. W. FLINT.
GAGE FOR MEASURING LIQUIDS.
APPLICATION FILED JAN. 5, 1914.
1,126,968.
Patented Feb. 2, 1915.
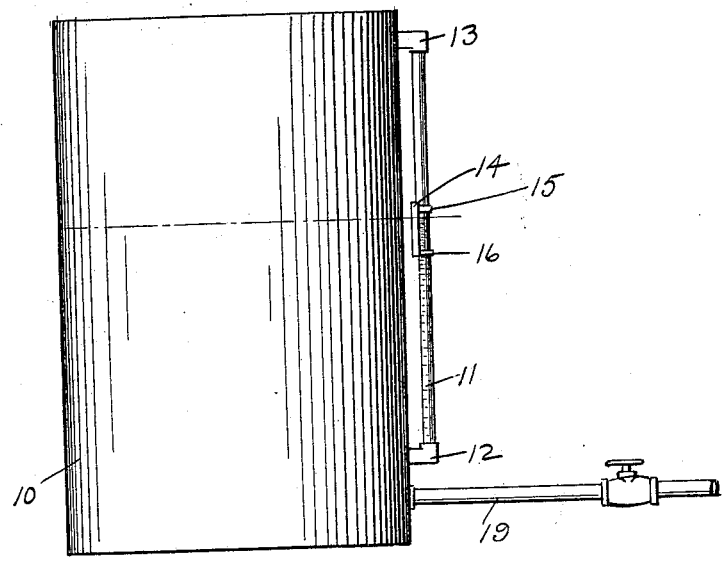
Fig. 1.
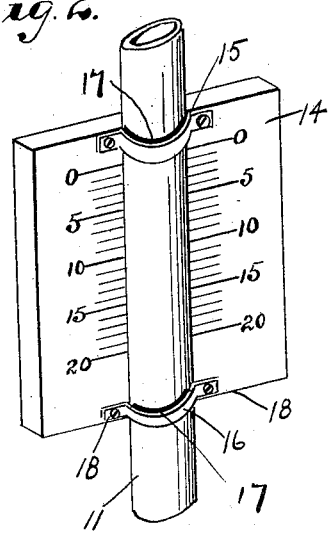
Fig. 2.
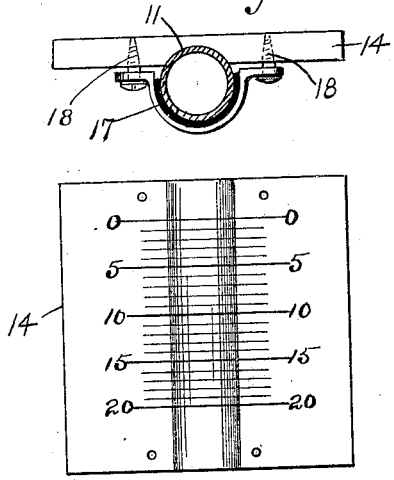
Fig. 3.
Fig. 4.
Inventor
Dutee W. Flint.
Witnesses
E. D. Ogden
Walter F. Fanning
By Howard E. Barlow
Attorney

UNITED STATES PATENT OFFICE.

DUTEE W. FLINT, OF PROVIDENCE, RHODE ISLAND.

GAGE FOR MEASURING LIQUIDS.

1,126,968.  Specification of Letters Patent.  Patented Feb. 2, 1915.

Application filed January 5, 1914. Serial No. 810,273.

*To all whom it may concern:*

Be it known that I, DUTEE WILCOX FLINT, a citizen of the United States, and resident of the city of Providence, in the county of Providence and State of Rhode Island, have invented certain new and useful Improvements in Gages for Measuring Liquids, of which the following is a specification.

This invention relates to improvements in gages for measuring liquids, the same being more especially adapted for measuring gasolene drawn from a receptacle in comparatively small quantities for supplying automobiles, motor boats, and the like, and the object of the invention is to provide a receptacle having a visible vertically disposed transparent tube extending the working height of the receptacle, and providing a plate whose face is graduated relative to the capacity of the receptacle and mounted to be slid along the tube whereby its zero mark may be set to register with the surface of the liquid in the tube at the beginning of each drawing operation, so that the exact amount of each drawing will be plainly indicated by the change of levels in the tube as indicated on the gage.

A further object of the invention is to support the graduated plate upon the tube by clamps which are adapted to be adjusted to regulate the sliding friction on the tube.

The invention further consists in extending the graduation marks around back of the tube whereby the liquid in the tube magnifies the same and causes them to be more readily observed and at a greater distance.

With these and other objects in view, the invention consists of certain novel features of construction, as will be more fully described and particularly pointed out in the appended claim.

In the accompanying drawings: Figure 1— is a side elevation showing my improved gage as applied to a gasolene tank. Fig. 2— is a perspective view showing the graduated plate slidably mounted on the transparent tube which is on the outside of the tank. Fig. 3— is a section through Fig. 2 on a line above the top of the graduated plate. Fig. 4— is a face view of the graduated plate showing the graduations as extending across the seat occupied by the tube.

In practice where gasolene is drawn from a tank in small quantities, such as from five to twenty gallons at a time, as in supplying automobiles or the like, it is found very desirable to provide an adjustable gage which may be readily set so that the zero mark will register with the surface of the liquid in the tube at the beginning of each drawing, in order to avoid mistakes by the operator in failing to remember where the previous drawing left off and the last one began. By my improved device it will be seen that as the gage is set at the beginning of his drawing the gage itself shows exactly and unmistakably just how much has been drawn, thereby avoiding mistakes and possible disputes. In accomplishing this object I have provided a device which is illustrated in the accompanying drawings, in which—

10 designates the tank or other receptacle in which the gasolene or other liquid to be measured is stored and 11 designates the transparent tube preferably of glass, which is connected through the members 12 and 13 at both its lower and upper ends to the tank to communicate therewith whereby the level of the liquid in the tube is visible and corresponds exactly with that in the tank. I have also provided a gage block or plate 14 which may be constructed of wood, or other suitable material, the same being graduated on its face to correspond to the cubical contents of the tank, which is so disposed relative to the tube 11 that a change of level in the same will be indicated by the scale on the plate. In other words when five gallons are drawn from the tank the level is lowered a predetermined amount, which amount is indicated by the graduations on the face of the plate, which represents the desired unit of measure such as gallons, cubic inches or the like. This plate is preferably supported on the glass tube by means of clamping members 15 and 16, which may be made of metal or other suitable material and are preferably lined as at 17, see Fig. 3, with leather, or other suitable frictioning or cushioning material. Each of these clamping members has laterally extending ends through which screws 18 are passed into the plate and the clamping tension or pressure of the plate to the tube may be nicely regulated by adjustment of said screws. I have shown and described this plate as being supported on the tube, but I do not wish to be restricted to this particular construction as the plate may be attached to the tank in any convenient manner if desired. The liquid in the tank may be drawn therefrom through a discharge pipe 19 which is located near its lower portion.

It will be seen in the operation of my improved gage that the level of the liquid in the tube corresponds to that in the tank. At the beginning of each drawing operation the graduated plate is set so that the zero mark is level with the surface of the liquid in the gage, therefore when any particular amount of gasolene is drawn from the tank the graduations which correspond to the change of level indicate at once the exact amount, which has been drawn from the tank. As the delivery pipe is now closed and the next vehicle comes into line to be supplied the operator again slides the plate down the tube until the zero mark again registers with the surface of the liquid therein, when the operation is repeated, each operation having its own summing up to indicate beyond dispute the sum and total amount drawn at each individual operation.

I claim.

A liquid measuring gage comprising a gage tube, a graduated plate, and means for frictionally and adjustably connecting said plate to said tube, said means comprising clips embracing the tube, and securing devices for adjustably connecting said clips to said plate, whereby friction may be varied.

In testimony whereof I affix my signature in presence of two witnesses.

DUTEE W. FLINT.

Witnesses:
HOWARD E. BARLOW,
E. I. OGDEN.